United States Patent [19]

Rothauser et al.

[11] 4,096,355
[45] Jun. 20, 1978

[54] COMMON CHANNEL ACCESS METHOD FOR A PLURALITY OF DATA STATIONS IN A DATA TRANSMISSION SYSTEM AND CIRCUIT FOR IMPLEMENTING THE METHOD

[75] Inventors: Ernst Hans Rothauser, Reichenburg; Daniel Wild, Kilchberg, both of Switzerland

[73] Assignee: International Business Machines Corporation, Armonk, N.Y.

[21] Appl. No.: 841,763

[22] Filed: Oct. 13, 1977

[30] Foreign Application Priority Data

Nov. 12, 1976 Switzerland ............. 14261/76

[51] Int. Cl.² .................................. H04J 3/08
[52] U.S. Cl. ........................ 179/15 AL; 179/15 AQ
[58] Field of Search ........ 179/15 AL, 15 AQ, 15 BA, 179/15 BY; 340/172.5, 147 LP, 150, 151, 152, 153

[56] References Cited

U.S. PATENT DOCUMENTS

| | | | |
|---|---|---|---|
| 3,597,549 | 8/1971 | Farmer et al. | 179/15 AL |
| 3,732,543 | 5/1973 | Rocher | 179/15 AL |
| 3,855,422 | 12/1974 | Cadiou et al. | 179/15 AL |
| 3,985,962 | 10/1976 | Jones et al. | 179/15 AL |

*Primary Examiner*—Thomas A. Robinson

[57] ABSTRACT

A method is disclosed by which several data stations which use a single communication channel, and which are simultaneously ready to transmit a data packet, can send a request for channel allocation, and will be granted the channel each for one data packet transmission, all within one time frame without central control, polling, or collisions. Addresses of all data stations desiring channel allocation are interleaved and superimposed in a specific manner for transmitting the requests, and by observing the resulting common signal, each data station determines when it can send its data packet. An arrangement for a data station is also disclosed which comprises the means necessary for transmitting address characters in an interactive procedure simultaneously with other stations, and for determining the allocated packet time slot.

8 Claims, 9 Drawing Figures

REQUESTING: 013 / 016 / 522 / 579

COMMON CHANNEL ACCESS METHOD FOR A PLURALITY OF DATA STATIONS IN A DATA TRANSMISSION SYSTEM AND CIRCUIT FOR IMPLEMENTING THE METHOD

FIELD OF THE INVENTION

The invention is concerned with an access method to a common transmission channel for a plurality of data stations in a data transmission system in which an address consisting of a plurality of address characters is assigned to each data station, and with an arrangement for implementing said method.

BACKGROUND

If several data stations use a single transmission channel in common, access to this channel must be so organized that at any time only one station can send data, e.g., in packet form. This may be accomplished by a pure time division multiplex operation, in which dedicated time slots of a cyclic time frame are allocated for a long time interval, or, on the other hand, the assignment of temporary short time slots upon request.

For this latter mode of operation several methods are known in the art. In polling systems a central location polls the data stations sequentially. If a data station has data ready to send, it provides an appropriate response, and thereupon the channel is allocated to it temporarily. One disadvantage of this type of operation is that all data stations, including those which are not ready to send, are polled. This results in a relatively high percentage of unused channel capacity. An additional disadvantage is the need for a sophisticated central control station.

Other known systems use the principle of random access. In this type of operation, each data station can send a data packet when it is ready, a synchronized partitioning of the channel time into time slots being provided. In such systems no central control is required. These systems, however, suffer from data collisions since data packets are frequently sent during the same time slot from different data stations and must then be repeated at a later time. This also increases the undesired percentage of unused channel capacity.

Furthermore, loop structured transmission systems are known in the art in which prior to or at the beginning of a time frame a request field circulates, into which each data station which is ready to send can enter its address or priority class. When this field returns to the control unit, it contains the highest address or class which requested channel allocation (in a first known system), or a superimposed representation of all classes requesting channel allocation from which it must select one (in another known system). A disadvantage is that in each frame channel allocation is effected to one data station or one class only while the others must repeat their request, possibly several times. Furthermore, these methods are restricted to loop structured transmission systems which in some environments is unreliable.

SUMMARY AND OBJECTS OF THE INVENTION

It is an object of the invention to provide a transmission method suitable for use in common multipoint channels in which a plurality of data stations which are ready to send can simultaneously issue their channel allocation requests without the necessity of central control and without the occurrence of collisions or the necessity of repeated operations. It is another object of this invention to enable each data station which is ready to send to determine from the superimposed channel allocation requests of several data stations, the channel time slot which is available to it for its data transmission.

The novel method disclosed herein provides a near optimum utilization of the available channel capacity, and a prompt acceptance of the requests of all data stations which are ready to send at the beginning of each time frame. It is particularly suited for local radio transmission systems and for closed cable systems, both of which are typical multipoint systems.

DESCRIPTION OF THE PREFERRED EMBODIMENT

Figure 1:
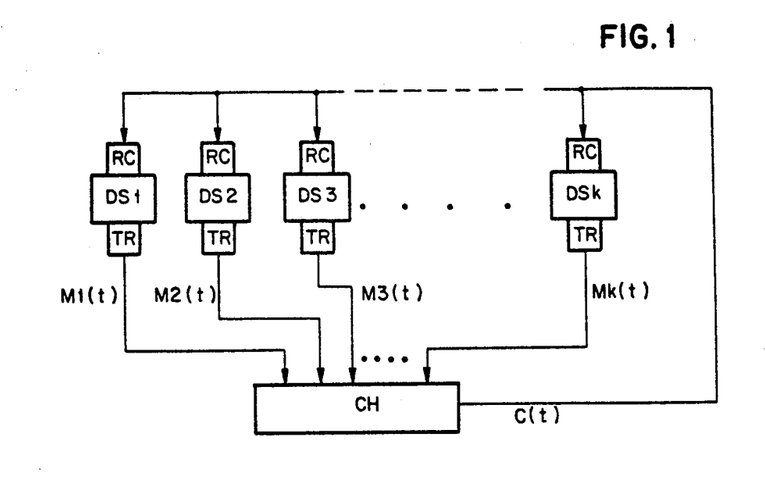
FIG. 1 is a schematic representation of a multipoint transmission system in which the invention may be used.

FIG. 1 is a generalized diagram of a data transmission system in which the invention can be used. A number of data stations DS1 . . . DS$k$, each comprising a transmitting unit TR and a receiving unit RC, are mutually interconnected by a common transmission channel CH for exchanging messages. Signals M1 ($t$) . . . M$k$ ($t$) of the individual data stations are superimposed in the transmission channel and result in a common signal C ($t$) which is received by all data stations.

The transmission channel CH can be a radio channel of a given frequency on which all data stations transmit and receive, or it can be a common conducting line or cable to which all data stations are connected.

The following conditions are assumed to be present:

a. Transmission is effected by binary signals, in bit synchronism and with a given bit frequency.

b. If the two signal values for the binary values 0 and 1 are superimposed, a signal results which represents the binary value 1.

c. Maximum transmission time, i.e., the longest signal propagation time between any transmitter TR and any receiver RC is small in comparison to the bit period.

Figure 2A:
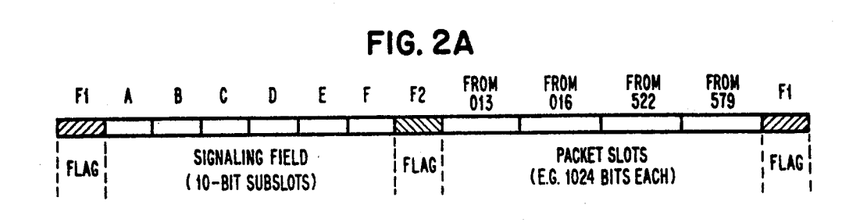
FIGS. 2A/2B are graphical representations of a time frame and the hierarchical arrangement of signaling subslots according to the invention.

Communication is effected in time frames of variable length as shown in FIG. 2A. The beginning of each time frame is marked by a flag, i.e., a unique multi-bit sequence F1. This is followed by a signaling or control field comprising a variable number of fixed bit length subslots A, B, C . . . , which are of equal length. The signaling field is followed by another multi-bit flag, F2, which indicates the beginning of the data transmission field. Data are communicated in packets of equal length, i.e., each comprising an equal number of bit positions (bit slots). The number of packets per time frame is variable. At any given time only one data station transmits a packet. Each data packet contains in its header at least the address of the data station to which this packet is directed. After communicating all packets of a frame, flag F1 is again transmitted, whereby the beginning of the next time frame is indicated.

Figure 2B:
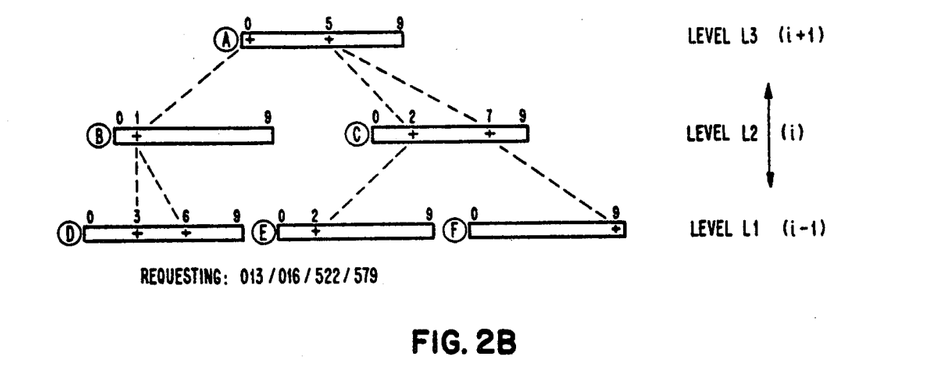

A further description of the invention is now made in connection with FIG. 2B in an embodiment for which the following is assumed:

a. The system has a maximum of 1000 data stations;
b. Three-digit decimal addresses are used;
c. The decimal digits of the addresses are represented in a 1-out-of-10 code for channel requests; and,
d. Subslots in the signaling or control field each comprise 10 bit positions.

When two stations transmit address digits 0 and 5, respectively, during the same subslot, all data stations receive two 1-bits, one of them in each of the bit positions 0 and 5. If, on the other hand, two data stations send the same decimal digit, e.g., 1, during a subslot, all data stations will receive during this subslot time only a single 1-bit, located in bit position 1.

All data stations are synchronized by an initial signal sequence which is transmitted by a main station (except for the capability to transmit this initial bit sequence, the main station otherwise is equal to all other data stations). Thereafter, the main station sends flag F1 whereupon all stations ready to send transmit their address digits in the subslots of the signaling field, according to the novel procedure of the invention which is diagramatically illustrated in FIG. 2B.

It is now assumed as an example that data stations 013, 016, 522, and 579 are ready to send when they receive flag F1. During the first subslot A, which has level 3, each one of the four data stations transmits its first address digit. The received common signal contains a 1 bit in positions 0 and 5. On the next level (2) each data station which is ready to send transmits its second decimal digit in one of the subsequent subslots, one subslot being provided for each received bit of level 3, e.g., for each distinguishable first decimal digit. Stations 013 and 016 transmit their second decimal digit 1 in subslot B, stations 522 and 579 transmit their second decimal digit in subslot C, decimal digits 2 and 7, respectively. Thereafter, the lowest level (1) for transmission of the last (third) decimal digit of each station address follows. Again, for each received bit of the previous level 2, one subslot is provided. Stations 013 and 016 transmit their last digits 3 and 6, respectively, in subslot D, stations 522 sends its last digit 2 in subslot E, and station 579 sends its last digit 9 in subslot F.

By counting the 1-bits received in the lowest level 1, e.g., during subslots D, E and F, and knowing its own bit's position, each station determines which position it has in the sequence of stations which are ready to send. In this same sequence all stations, after receiving flag F2, automatically transmit their data packets. Station 522, e.g., which transmitted its last address digit as the third station, waits two data packet slots and then transmits its own data packet in the third data packet slot.

In this way, all stations which are ready to send are served sequentially during a single time frame and there are no collisions. The number of packets in each time frame corresponds exactly to the number of data stations which are ready to send, and the number of signaling subslots depends on the total number of requesting addresses, but also on how many common components (common digits) are present in these addresses.

Transmission of the flags F2 and F1 after an initial synchronization can be effected by the main station, or, alternatively, in any time frame by all data stations which are ready to send, i.e., which are active. If the latter procedure is used, each active data stations sends a flag F2 after it has received as many subslots on level 1 (D, E, and F, i.e., three) as the number of address bits it received on level 2 (1 in B, 2 and 7 in C, i.e., three). Also, each active station transmits a flag F1 after it received as many data packets (in this example: four), as the number of address bits which it received in the signaling subslots of level 1 (3 and 6 in D, 2 in E, 9 in F, i.e., four).

An additional feature that may be provided is that all stations again transmit a flag F1 if they do not receive an address bit in the first subslot following a received flag F1. Thus, in an idling period, i.e., if none of the data stations is ready to send, F1 flags are transmitted continuously in the absence of data and control signals so that synchronization is maintained once it has been established.

CIRCUIT DETAILS OF AN EMBODIMENT

Figure 3:
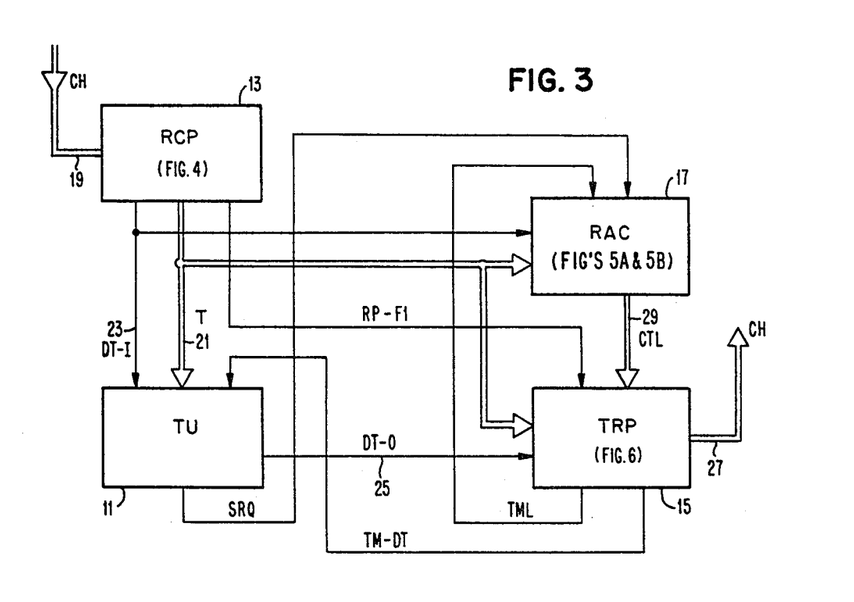
FIG. 3 is a block diagram of a data station constructed according to the invention.

FIG. 3 shows in block form a novel data station suitable for executing the novel method of the invention.

The data station comprises a data terminal unit TU 11, which includes input/output units, a small processor, and storage means for received data and for data to be transmitted as well as for programs of the processor. Unit TU receives data and time signals from a receiving unit RCP 13 and furnishes data to a transmitting unit TRP 15. This unit need not be described here in more detail since it is not part of the invention and such data terminal units are generally well known in the art. It is assumed here that unit TU issues a request signal SRQ as long as it has data ready to be sent and has not yet been served, and that in response to control signal TM-DT which it receives from the transmitting or sending unit 15, it furnishes its data which are ready to be transmitted.

Receiving unit RCP 13 will be described in greater detail in connection with a description of FIG. 4. It receives data signals at an input 19 from channel CH and furnishes time signals T over bus 21, and input data DT-I over bus 23 to other units of the data station.

Transmitting unit TRP 15 will be described in greater detail in connection with the description of FIG. 6. It receives the time signals T from receiving unit RCP 13 over bus 21 and output data DT-O on line 25 from data terminal unit TU, and furnishes data signals at an output 27 to channel CH. Furthermore, it receives control signals CTL on bus 29 from a request and access control unit RAC 17.

Request and access control unit RAC 17 will be described in greater detail in connection with the description of FIGS. 5A and 5B. It receives time signals T and input data from receiving unit RCP over buses 21 and 23, respectively. Control signals SRQ, TM-DT, RP-F1, and TML are exchanged between the four functional units TU, RCP, TRP and RAC. Details of these functional units and the meaning of the various time and control signals will be explained later in connection with the description of FIGS. 4 through 7.

RECEIVING UNIT RCP

Figure 4:
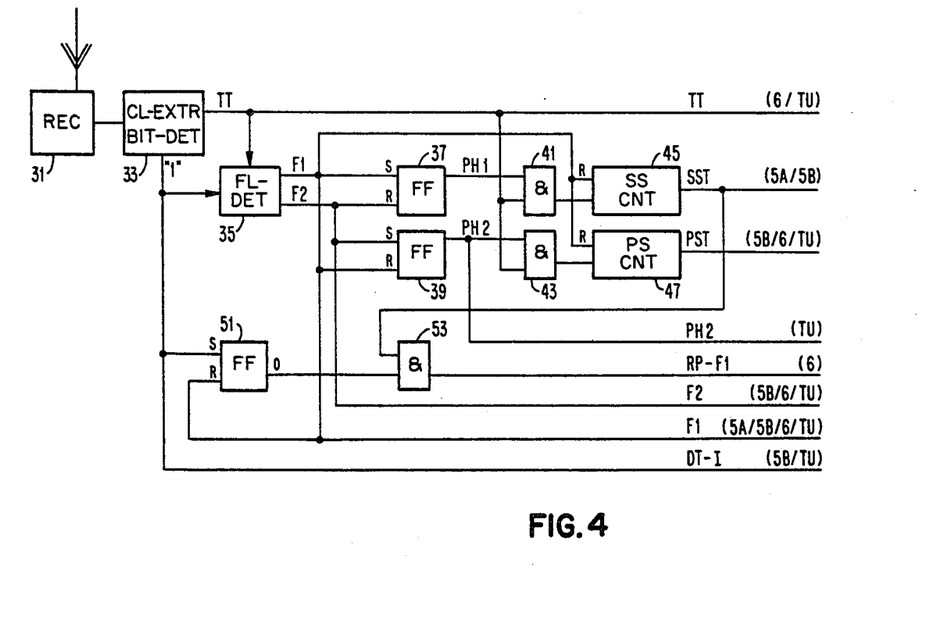
FIGS. 4/5A/5B/6 illustrate circuit details of elements shown in block form in FIG. 3.

The receiving unit shown in FIG. 4 comprises a receiver REC 31, for the signals which are transmitted over channel CH, connected to a clock signal extractor and bit detector CL-EXTR/BIT-DET 33. This functional unit derives a clock pulse TT from the received signals and furnishes the clock pulse TT to an output line so labeled. Furthermore, it determines from the received signal whether at the sampling instants which are given by TT a 0-bit or a 1-bit is present, and furnishes a single pulse to bus DT-I (Input Data) if a 1-bit is present. The input data and clock pulses are also applied to a flag detector FL-DET 35 which tests the received bit sequence and issues at a respective output a single pulse if a flag F1 of F2 was recognized (at the last bit time of the received flag). Two bistable latches 37 and 39 are each connected to one output of the flag detector and furnish, after receipt of a flag F1 or F2, a static signal at their outputs to lines PH1 (Phase 1) or PH2 (Phase 2), respectively, which is present until the respective latch is reset. This is effected by pulses on line F2 for latch 37 or F1 for latch 39, respectively.

The first input of each of two AND gates 41 and 43 is connected to signal line PH1 or PH2, respectively, while the second input of both is connected to clock line TT. A counter SS CNT 45, the counting capacity of which is equal to the number of bit positions per subslot, is connected to AND gate 41. This counter, at every tenth received clock pulse, furnishes a control pulse on line SST (subslot time signal). A counter PS CNT 47, the counting capacity of which is equal to the number of bit positions per data packet, e.g., 1024, is connected to AND gate 43. This counter furnishes a single pulse PST (packet slot time signal) when it overflows. Both counters have reset inputs which are connected to line F1.

A line RP-F1 (repeat flag F1) is provided at the output of a combination of a bistable latch 51 and AND gate 53. The set input of this latch is connected to data input line DT-I and the reset input is connected to signal line F1. The inputs of AND gate 53 are connected to the 0-output of latch 51 and to the SST-line (output of counter 45), and its output is the signal RP-F1.

REQUEST AND ACCESS CONTROL UNIT RAC

Figure 5A:
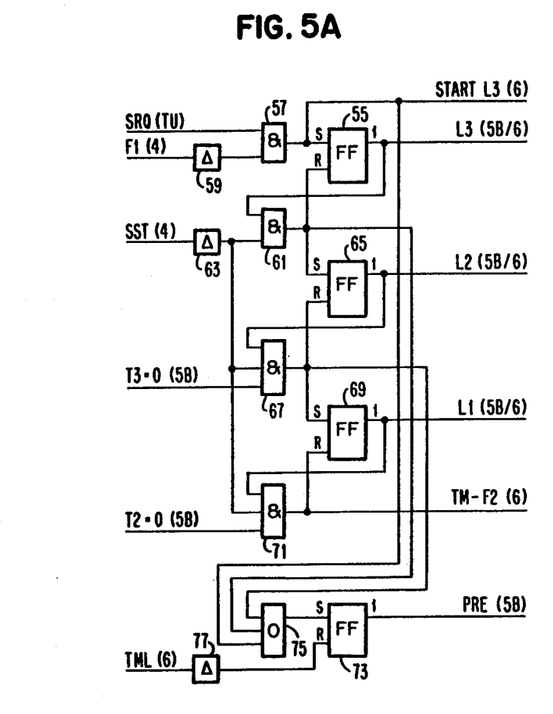
Figure 5B:
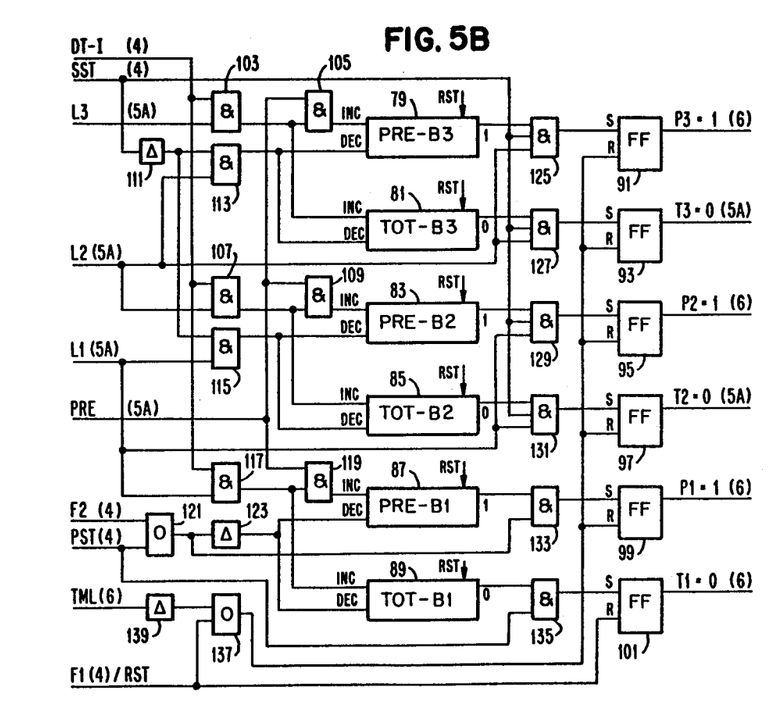

To improve clarity this functional unit is illustrated in two separate figures (FIGS. 5A and 5B).

The first part (FIG. 5A) serves for generating control signals which indicate the current level (L3, L2, L1) during the request phase (signaling field).

The set input of a bistable latch 55 is connected to the output of an AND gate 57 one input of which is connected to the send request line SRQ from the data terminal unit TU, and the other input of which is connected through a delay circuit 59 to line F1 (pulse for flag F1). The delay time is so chosen that the output pulse starts only when the input pulse ends, so that the signals which are caused by the output pulse of the delay element do not coincide (overlap) with the input pulse (or other pulses which are simultaneous with the input pulse). The same conditions are assumed for the other delay elements which are mentioned in the following parts of this description.

The output of AND gate 57 is connected to a line START L3. The 1-output of latch 55 is connected to a line L3 which is also connected to the input of an AND gate 61. The other input of that AND gate is connected through a delay element 63 to line SST (subslot time signal). The output of AND gate 61 is connected to the reset input of latch 55 and to the set input of a bistable latch 65. The 1-output of the latter is connected to line L2.

An AND gate 67 has three inputs, one of which is connected to line L2, another of which is connected to the output of delay element 63, and the third of which is connected to a line T3=0 (from latch 93 in FIG. 5B). The output of AND gate 67 is connected to the reset input of latch 65 and also the set input of a bistable latch 69. The 1-output of the latter is connected to line L1.

An AND gate 71 has three inputs, one of which is connected to line L1, another of which is connected to the output of delay line 63, and the third of which is connected to line T2=0 (from latch 97 in FIG. 5B). The output of AND gate 71 is connected to line TM-F2, and is also connected to the reset input of latch 69.

An additional bistable latch 73 is provided. Its set input is connected through an OR gate to the output of AND gates 57 (START L3), 61 and 67. Its output is connected to control line PRE (leading to AND gates 105, 109, and 119 in FIG. 5B). The reset input of latch 73 is connected through a delay element 77 to a line TML (transmit line) which is also connected to an OR gate 181 in FIG. 6.

The second part (FIG. 5B) of the request and access control unit RAC serves for counting the received request address bits and for counting the number of request subslots and data packets which were transmitted and/or received. It includes mainly six up-down counters 79, 81, 83, 85, 87, 89, and six corresponding bistable latches 91, 93, 95, 97, 99 and 101. All counters have two pulse inputs for respectively increasing (INC) or decreasing (DEC) the contents, and a reset input RST. Each of counters 79 (PRE-B3), 83 (PRE-B2), and 87 (PRE-B1) furnishes at its output which is designated by a "1" an active signal when its contents is equal to one. Each of the other three counters 81 (TOT-B3), 85 (TOT-B2), and 89 (TOT-B1) furnishes at its output which is designated by a "0" an active signal when its contents is equal to zero. Counters 79 and 81 for level L3 each have a capacity of 10 units (equal to the number of bits in a subslot of level L3). Counters 83 and 85 each have a capacity of 100 units (equal to the product of the maximum number of subslots in level L3 and the number of bits per subslot). Counters 87 and 89 each have a capacity of one thousand units (corresponding to the number of data stations).

An AND gate 103 combines the signals on line DT-I (Input Data, one signal pulse for each received "1") and line L3, and furnishes its output pulses directly to the INC-input of counter 81 and, through an AND gate 105, to the INC-input of counter 79. An AND gate 107 combines the signals on line DT-I and line L2 and furnishes its output pulses directly to the INC-input of counter 85 and, through an AND gate 109, to the INC-input of counter 83. The second inputs of AND gates 105 and 109 are connected to line PRE (from latch 73).

The pulses from line SST (subslot time signal) are delayed by a delay element 111 and are then furnished to the first inputs of two AND gates 113 and 115. The second input of AND gate 113 is connected to line L2, its output to the DEC-inputs of counters 79 and 81. The second input of AND gate 115 is connected to line L1, and its output to the DEC-inputs of counters 83 and 85.

An AND gate 117 ands the signals on line DT-I and on line L1 and furnishes its output pulses directly to the INC-input of counter 89 and, through an AND gate 119, to the INC-input of counter 87. The second input of AND gate 119 is connected to line PRE.

An OR gate 121 ors the signals on line F2 (Flag F2 received) and on line PST (packet slot time signals), and furnishes its output pulses through a delay element 123 to the DEC-inputs of counters 87 and 89.

To enable sampling of the counting value, the outputs (1 or 0, respectively) of counters 79 and 81 are connected through AND gates 125 and 127, respectively, to the set input of bistable latches 91 and 93, respectively. The second inputs of AND gates 125 and 127 are connected to line SST, and their third inputs to line L2. The outputs (1 or 0, respectively) of counters 83 and 85 are connected through AND gates 129 and 131, respectively, to the set inputs of bistable latches 95 and 97, respectively. The second inputs of AND gates 129 and 131 are connected to line SST, and their third inputs to line L1. The outputs (1 or 0, respectively) of counters 87 and 89 are connected through AND gates 133 and 135, respectively, to the set inputs of bistable latches 99 and 101, respectively. The second input of AND gate 133 is connected to the output of OR gate 121, and the second input of AND gate 135 is connected to line PST.

The reset inputs of latches 91 through 99 are connected to an OR gate 137, one input of which receives pulses from line F1 and the other input of which receives pulses from line TML (from OR gate 181, FIG. 6) which have been delayed by circuit 139. The pulses on line F1/RST are also used as reset pulses for the counters. Line F1/RST is also connected to the reset input of latch 101. The 1-outputs of latches 91, 93, 95, 97, 99, and 101 are connected to signal lines P3=1, T3=0, P2=1, T2=0, P1=1, and T1=0.

TRANSMITTING UNIT TRP

Figure 6:
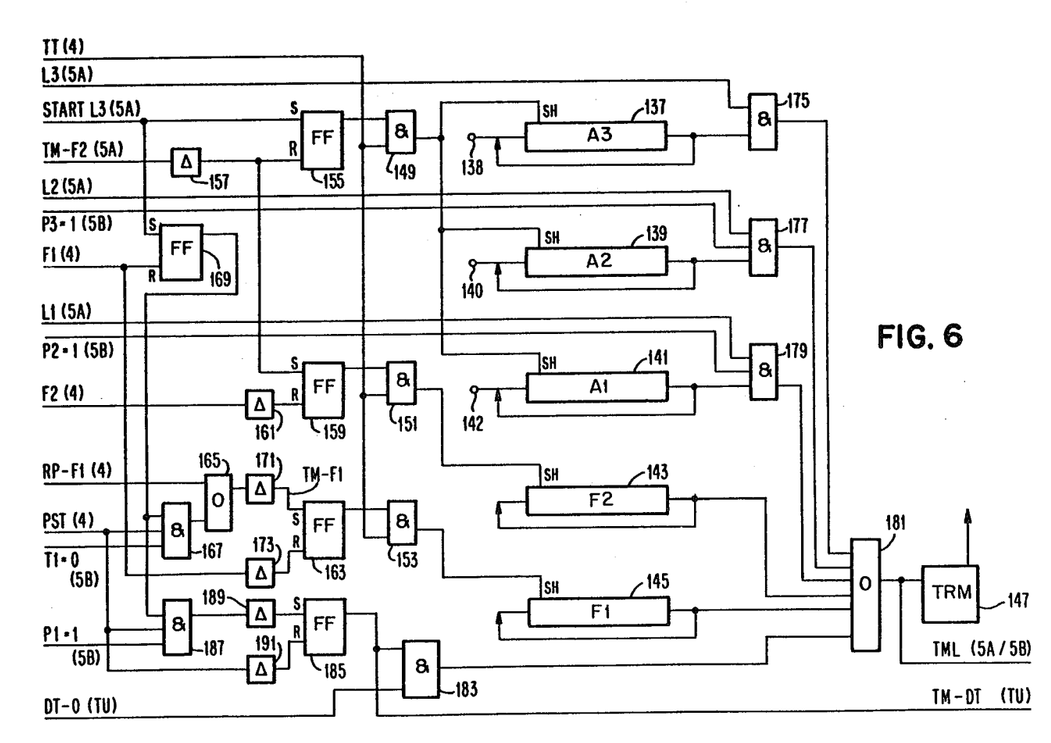

The transmitting unit is shown in FIG. 6. It includes mainly five shift registers 137, 139, 141, 143 and 145 for the three 1-out-of-10 coded address digits A3, A2, A1 of the respective data station, and for the two flags F2 and F1. Each of these shift registers has an input SH for shift pulses and a feedback connection between the data output and the data input. New address digits A1, A2, A3 are entered through input ports 138, 140, 142. Furthermore, the transmitting circuit contains transmitter TRM 137 to which the contents of each of the five shift registers, or output data from the data terminal unit TU can be furnished, and which provides corresponding signals to channel CH.

Clock line TT is connected through an AND gate 149 to the shift inputs of shift registers 137, 139, 141, through an AND gate 151 to the shift input of shift register 143, and through an AND gate 153 to the shift input of shift register 145. The second input of AND gate 149 is connected to the 1-output of a bistable latch 155, the set input of which is connected to line START L3. The reset input is connected through a delay element 157 to line TM-F2 (transmit flag F2). The second input of AND gate 151 is connected to the 1-output of a bistable latch 159, the set input of which is connected through delay element 157 to line TM-F2 and the reset input of which is connected through a delay element 161 to line F2. The second input of AND gate 153 is connected to the 1-output of a bistable latch 163.

Line RP-F1 is connected to the first input of an OR gate 165, the second input of which is connected to the output of an AND gate 167. The three inputs of this AND gate 167 are connected to lines T1=0, PST (packet slot time signal) and to the 1-output line of a bistable latch 169. The set input of the latter is connected to line START L3, and its reset input to line F1. The output of OR gate 165 is connected to the set input of latch 163 through a delay element 171. Signal TM-F1 (transmit flag F1) appears at the output of this delay element. The reset input of latch 163 is connected through delay element 173 to line F1. An AND gate 175 receives signals from line L3 and from the output of shift register 137. An AND gate 177 receives signals from lines L2 and P3=1, and from the output of shift register 139. An AND gate 179 receives signals from lines L1 and P2=1, and from the output of shift register 141. The outputs of the three AND gates 175, 177 and 179 are connected to three inputs of an OR gate 181, the output of which is connected to transmitter 147 and to a line TML (transmit line). A fourth and fifth input of OR gate 181 are connected to the output of shift registers 143 and 145, respectively. A sixth input of OR gate 181 is connected to the output of an AND gate 183 which in turn has its input connected to line DT-O (output data) from the data terminal unit. Its other input is connected to the 1-output of a bistable latch 185. An AND gate 187 ands the signals on lines P1=1, PST (packet slot time signal), and the output signal of latch 169, and furnishes its output signal through a delay element 189 to the set input of latch 185. The reset input of latch 185 is connected through a delay element 191 to line PST. The output of latch 185 is also connected to line TM-DT (transmit data).

OPERATION

The operation of the circuitry according to FIGS. 3 through 6 in executing the method of the invention will now be explained with the aid of the timing diagrams of FIG. 7. Duration of the pulses and intervals in this diagram is not shown to scale. It is only intended to show the relative time relationships and mutual conditions.

All data stations go through the upper nine of the sixteen shown signal sequences. The first seven signal sequences (TT, F1, F2, PH1, PH2, SST and PST) are the time signals generated by the receiving unit. The next signal (data packets in) represents the timing control for the reception of data packets. The ninth signal (RP-F1 = repeat flag F1) occurs only in special situations and will be explained later.

The lower seven sequences occur only in data stations which have data to be transmitted. Signals L3, L2, L1 are identical for all requesting data stations, whereas the lower four signals PRE, P1=1, TML and TM-DT (transmit data) are different for each requesting data station, depending on the address. As an example, the signals for data station 522 according to the pattern shown in FIGS. 2A/2B are shown.

At the last bit clock pulse of flag F1 which starts a new time frame (and which is initially transmitted by the main station), a pulse F1 from the output of flag detector 35 resets a latch 73 (PH1) in all data stations and resets latch 55 (L3) in each data station which is ready to send. All counters are reset, as well as latches 51, 91 ... 101, 163, and 169. Thus, phase PH1 starts, and simultaneously level interval L3 which corresponds to the first subslot (A in FIGS. 2A/2B).

Counting cycles are started in subslot counter 45 which now receives counting pulses TT from AND gate 41 and which, at every tenth input pulse, furnishes an output pulse SST which indicates the end of a subslot. The signal "START L3" in those stations which are ready to send sets latches 55 and 73, as well as latch 155 so that clock pulses TT pass through AND gate 149 to provide cyclic shifting of shift registers 137, 139 and 141. A pulse which represents the most significant address digit of the station is transferred at the respective bit time through AND gate 175 which was conditioned by signal L3 to line TML and further to transmitter 147. In the receiver, the bit pulses of all stations which are ready to send are received and are transferred through data input line DT-I to counters 79 and 81. The input to counter 79, however, is inhibited after transmission of the station's address bit because the pulse on line TML resets latch 73 and thus ends the PRE signal and inhibits AND gate 105.

At the end of the subslot when the SST pulse appears, counter PRE-B3 (79) contains a number which indicates how many different decimal digits in the hundredth positions were transmitted as request addresses and which were less than or equal to the hundredth decimal digit of the respective data station. Counter TOT-B3 (81) contains the total number of different transmitted decimal digits in the hundredths position. In the example for station 522:PRE-B3=2, but also TOT-B3=2.

The SST-pulse resets latch 55 and sets latches 65 and 73 via AND gate 61. This results in the beginning of the L2 interval and its first subslot B. AND gate 113 is conditioned by L2 so that the first SST-pulse, and all SST-pulses which follow during L2, decrease, with some delay, the contents of counters PRE-B3 and TOT-B3 each time by one unit. Previous to each decreasing step, however, both counters are sampled by the nondelayed SST pulse, and if P3=1 or T3=0, latches 91 or 93, respectively, will be set. If 91 is set, this means: transmit station second digit; if 93 is set, this means: end of level L2 and transition to level L1.

For station 522 both conditions are not yet satisfied at the beginning of subslot B. Contents of its shift registers 137...141 still circulate but no address bit is transferred to the transmitter. Stations 013 and 016, however, transmit a "1"-bit in position 1 of subslot B. This address bit, as well as all following address bits during the interval L2, is passed through AND gate 107 to counters 83 and 85. Input to counter 83, however, is later inhibited.

At the second SST-pulse subslot B is finished, counters 79 and 81 are decreased (both to 0). Previously latch 91 was set (because P3=1). Counters 83 and 85 both contain the value 1. During the next subslot (C in FIGS. 2A/2B) AND gate 177 is conditioned, and thus the address bit of the second digit of station 522 is transferred in the second bit position to the transmitter (also in station 579 but there only in bit position 7). Latch 73 is reset by the TML-pulse so that counter PRE-B2 receives only the station address bit from station 522 but no longer that of station 579 as counting pulse while counter TOT-B2 receives both pulses.

At the next SST-pulse counter 81 is sampled and latch 93 is set because T3=0. Counter 83 (PRE-B2) now contains the value 2, counter 85 (TOT-B2) contains the value 3. Both are also sampled, but in station 522 without success because P2≠1 and T2≠0. Because T3=0, pulse SST through AND gate 67 resets latch 65 and sets latches 69 and 73. As a result, interval L1 starts and simultaneously the fourth subslot D. From now on, all received data bits are transferred as counting pulses to counters 87 (PRE-B1) and 89 (TOT-B1), while in response to all SST pulses (delayed) counters 83 and 85 are decreased by one unit. The input to counter 87, however, will later be inhibited after transmission of the station address bit (for the third decimal digit).

The contents of shift registers 137, 139 and 141 continue to circulate in all data stations which are ready to send. Now in each station in which P1=1, the third address bit is transferred through AND gate 179 to the transmitter. In subslot D this is address bits 3 and 6, respectively, in stations 013 and 016, respectively. As a result, counters 87 and 89 each are increased by two units. At the SST pulse at the end of subslot D both contain a 2; counter 83, however, contains a 1 and counter 85 a 2. Latch 95 is then set (P2=1) thus indicating that subsequently station 522 must transmit its address bit. Both counters are decreased by one unit after sampling so that TOT-B2 then contains a 1.

At this time subslot E starts and station 522 transfers its third address bit in bit position 2 from shift register 141 through AND gate 179 to the transmitter. Pulse TML resets latch 73 so that counter 87 after increasing to the value of three is inhibited. Counter 89 is also increased to the value three. At the following SST pulse, T2≠0 is detected and thereafter the counter contents is again decreased by one unit to the value zero. The subslot F starts and station 579 transmits its last address bit which is transferred in all stations as counting pulse to counter 89, but no longer to counter 87 in station 522 (and all stations having a lower address).

At the next and last SST pulse the following occurs: counter TOT-B2 is sampled and latch 97 is set because T2=0. As a consequence, the delayed SST pulse resets latch 69. Thus the L1 interval ends. Latch 155 is also reset by pulse TM-F2 so that circulating of address bits is finished in all stations.

Counter PRE-B1 (87) now indicates in which sequential position of all stations the respective station may transmit a data packet (in station 522 it contains a three), and counter TOT-B1 (89) indicates the total number of data packets which will be transmitted during the respective frame. The task of processing the requests and allocation of packet slots for all data stations which are ready to transmit has thus been executed.

In response to signal TM-F2 (transmit flag F2) latch 159 is set so that clock pulses TT are transferred through AND gate 151 to shift register 143 which contains the bit sequence for the second flag F2. This sequence now passes to all data stations which were ready to send and have transmitted their address, to transmitter 147.

At the last bit clock pulse of flag F2 latch 37 is reset in all operating data stations by pulse F2, and thus phase PH1 is finished. Latch 39, however, is set so that phase PH2 starts which corresponds to the packet slots. Counter 47, the capacity of which corresponds to the bit number of a data packet, receives clock signal TT and issues a pulse PST at the end of each packet slot interval. Latch 159 is also reset in response to pulse F2 so that shift register 143 (F2) is quiesced.

Now in each data station counter PRE-B1 (87) is tested for contents one by pulse F2 and by the following PST pulses; counter TOT-B1 (89) is tested for contents zero in each data station by each PST pulse. Contents of the respective counters are decreased by one unit subsequent to each of these pulses. Now sequentially in each station, in the order of their addresses, latch 99 is set when P1=1. In data station 522 this is the case at the end of the second packet slot. Latch 185 is set with a certain delay in response to signal P1=1, to pulse PST, and to the output signal of latch 169, through AND gate 187. Latch 185 furnishes during one packet slot interval, i.e., until the next PST pulse, the signal TM-DT (transmit data) which is transferred to the data terminal unit for causing a transfer of the buffered data packet over line DT-O (output data) and over AND gate 183 to transmitter 147. Signal TM-DT is shown in diagram FIG. 7. Thus, at any time during phase PH2 only one data station transmits a data packet, whereas all data stations receive all data packets.

Figure 7:
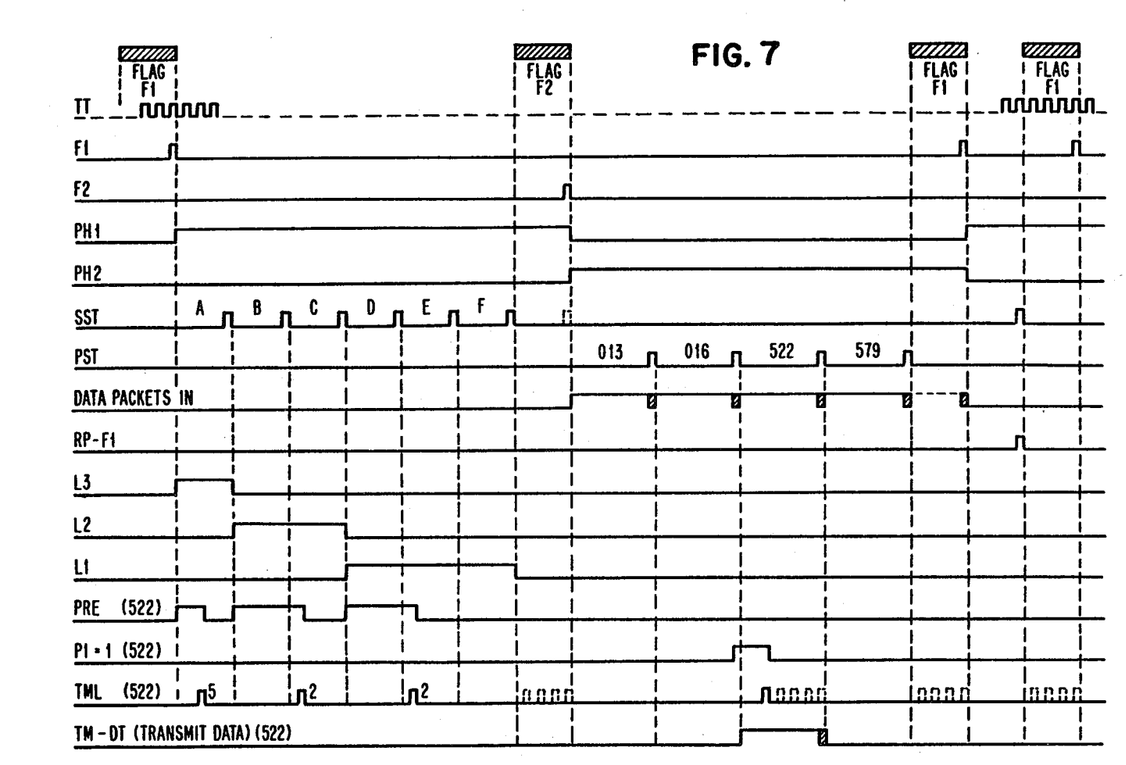
FIG. 7 is a timing diagram used for explaining the method and the operation of the circuitry.

In each data station, signals PH2 and PST for identifying packet channels, flag pulses F1 and F2, clock pulses TT, as well as the data input signal DT-I are furnished to the data terminal unit TU which thus can receive and identify individual data packets (signal combination "data packets in," FIG. 7). Using the destination address in each data packet, the data terminal unit determines whether the data packet is directed to itself and must be received or not.

A data terminal unit which is ready to send resets signal send request SRQ when it transfers its data packet from the output buffer (not shown). Thereupon it can transfer a further data packet into its output buffer and can again activate the SRQ signal.

During transmission of the last data packet of a time frame, counter 89 (TOT-B1) contains a value zero in all data stations which transmitted a data packet during that respective time frame. Pulse PST at the end of the last packet slot therefor sets latch 101 (T1=0) in all these data stations. Thereafter the signal T1=0, the PST pulse, and the output signal of latch 169 via AND gate 167, OR gate 165 and the delay element 171 which provides signal TM-F1 (transmit flag 1) set latch 163. Clock pulses TT are then gated through AND gate 153 to the shift input of shift register 145 which now emits the bit sequence for flag F1 to transmitter 147. All data stations which have transmitted a packet thus transmit simultaneously flag F1 which indicates the beginning of a new time frame.

The bit sequence for F1 is received by all data stations and generates in each of them control pulse F1 at the last clock pulse of the flag. This control pulse resets latches 163 and 169 in those data stations which transmitted a packet. Furthermore, in all data stations latch 39 is reset and latch 37 is set whereby phase 2 ends and phase 1 (PH1) starts again.

All other operations are now repeated as described above for the situation in which the first flag F1 was received.

IDLING

If after receipt of the flag F1 no data station has data available which are to be transmitted, flag F1 is repeated in regular intervals as will be described below until in at least one of the data stations signal SRQ becomes active and thus causes the transmission of the respective data station address as a channel request.

In response to the occurrence of control pulse F1, latch 51 is reset. Simultaneously subslot counter 45 starts counting (emits a pulse after each 10 bit period, i.e., after the duration of one subslot). If during the first subslot any "1"-bit (address bit) is received, latch 51 is reset. If, however, no "1"-bit is received (i.e., if no data station transmits its first address digit), the next SST pulse is gated to line RP-F1 (repeat flag F1). This pulse is transferred in all data stations through OR gate 165 and delay element 171 as signal TM-F1 (transmit flag F1) to the set input of latch 163. As a result clock pulses are furnished to shift register 145, so that each data station transmits flag F1 through its transmitter 147. At the last clock interval of the received bit sequence for flag F1, in each data station control pulse F1 is generated and the events are repeated as was described above.

ALTERNATIVES

Within the scope of the invention, many variations and amendments of the embodiment are possible of which a few will be mentioned in the following.

LONGER SIGNAL PROPAGATION TIME/RELAY STATION

If the data stations are spread over such a large area that the maximum signal propagation time between data stations does not allow a perfect synchronization of operations (at a given bit rate), a relay station and an alternating operation mode can be provided in which first the data stations transmit and the relay station receives whereafter the relay station retransmits the received superimposed signals of all data stations, while all data stations receive this combined signal. In this mode, each data station can be optimally synchronized with the relay station. The alternating transmit and receive intervals can be delimited by preselected flags (bit sequences).

INTERNAL PROCESSING TIME/BREAK INTERVALS

If the processing time in the circuitry is so long that in response to a received data bit a selection of the next data bit to be transmitted is not possible in some instances, one can provide a break interval after each subslot in the signaling field (e.g., an empty bit position), whereas the capacity of counter 45 (SS CNT) is increased by one. The contents of shift registers 137, 139, 141 would also have to be increased by one empty bit position.

ADDRESS LIST/PRIORITY/ERROR CHECKING

Additional means can be provided by which in each data station the addresses of all requesting data stations can be determined from the contents of the subslots of the signaling field, which address can be stored as a list. The following then is possible:
 a. Another sequence for packet slot allocation can be chosen than that of ascending addresses, e.g., with the aid of an association table or an association algorithm;
 b. A check can be made for received data packets whether they were actually transmitted during a packet slot for which the respective data station was authorized to transmit.

MODIFIED SEQUENCE FOR TRANSMISSION OF ADDRESS DIGITS

Instead of transmitting initially all first, then all second, and thereafter all third address digits, all in ascending sequence, as is described in the embodiment (sequence A,B,C,D,E,F), one could initially transmit completely the lowest address, thereafter the next lowest and so on. In this mode of operation, one would change several times between levels, and the sequence of subslot would then be, according to the pattern of FIG. 2B, A-B-D-C-E-F. For such a solution, a different design of the circuitry would be necessary, of course.

OTHER NUMBER BASES FOR ADDRESSES/OTHER NUMBER OF LEVELS

Instead of using three-digit decimal numbers, the addresses could be numbers with a different number of positions and a different number basis. The number of levels and the number of bits per subslot would have to be modified accordingly. Depending on the number of data stations and the expected average number of simultaneous sending requests an optimum design is possible.

VARIABLE PACKET LENGTH

Length of the data packets need not necessarily be of fixed length as was shown in the embodiment. A variable length could be identified in the header of each data packet, or the data packets could be delimited by a suitable delimiter. In the first case, counter 47 (PS CNT) would have to be settable to different length values, and in the second case flag detector 35 would have to be provided with another output which, after recognition of the delimiter would furnish the signal PST (counter 47 would be omitted in these arrangements).

While the invention has been particularly shown and described with reference to a preferred embodiment thereof, it will be understood by those skilled in the art that various changes in form and details may be made therein without departing from the spirit and scope of the invention.

What is claimed is:

1. A method by which a plurality of data stations in a data transmission system can access a common transmission channel in a predetermined sequence thereby eliminating any possibility of contention, said stations each being provided with a plural character address selected from an ordered set of plural character addresses and comprising the steps of:

at each said station requiring transmission capacity, transmitting a unique indicia of its first address character in a first fixed length time slot immediately following receipt of a first unique multi-bit flag character;

thereafter each said station requiring transmission capacity transmitting a unique indicia of its second address character in one time slot of a second group of fixed length time slots as a function of the total number of unique indicias transmitted and received in the said first fixed length time slot and the order position of its first address characters;

following transmission and receipt of said second group of fixed length time slots each station requiring transmission capacity transmitting a unique indicia of its third address character in one time slot of a third group of fixed length time slots as a function of the total number of unique indicia transmitted and received in each of the time slots of the second group of fixed length time slots and the order position of its said second address character, the above described sequence continuing for as many times as the stations have address characters until all stations requiring transmission capacity have transmitted a unique indicia for each character in the station address whereby the indicia transmitted in the first fixed length time slot and in the succeeding groups of time slots identify the stations requiring transmission capacity; and, thereafter at each station requiring transmission capacity transmitting a data packet in an ordered sequence indicated by the unique address indicia.

2. A method according to claim 1 characterized in that if a plurality of data stations have transmitted an identical unique address character in the same slot each transmits its next unique address character together with the other data stations of said plurality in a common time slot of a subsequent group.

3. A method according to claim 1 characterized in that the address characters are digits of a number base $n$, which are represented in a 1-out-of-$n$ code, and that each time slot comprises $n$ bit positions so that if $v$ different address characters are inserted in one time slot, $v$ bit positions are marked in that time slot.

4. A method according to claim 1 further characterized in that communication over the transmission channel is effected in frames of incrementally variable length, a plurality of time slots of equal length for communicating address characters following after receipt of the first flag and that after a second flag is received a plurality of time slots following each for communicating one data packet, and that the frame is ended thereafter by the receipt of a said first flag which marks the beginning of the next frame.

5. A method according to claim 4 in which each station monitors the channel and transmits the first and second flag characters in accordance with the criteria set forth.

6. A data transmission system for providing data transmission between a plurality of data stations connected to each other by a common transmission channel, said transmissions being conducted in time spaced frames delimited by first unique flag signals and including a first portion having a variable number of fixed length address time slots within which data stations may insert indicia corresponding to their address and a second portion separated from said first portion by a second unique flag and having a variable number of data packet slots equal in number to the number of stations requiring transmission capacity, each of said data stations including:

means for receiving data signals from said common channel and for distinguishing address time slot intervals after receipt of a said first flag;

means for separately transmitting unique indicia of address characters which are assigned to the respective data station, in selected address time slots;

means for distinguishing level intervals, each corresponding to the position of the currently transmitted unique indicia of the address characters within their addresses;

counting means for separately counting in each level interval, until transmission of the data station unique indicia address character, the different unique indicia address characters detected in the received signal, and for decreasing the respective count value by one unit with the occurrence of each address time slot interval within the next following level interval; and control means for enabling transmission of a first unique indicia of the address character during a first address time slot interval after receipt of a said first flag (F1), and transmission of one further unique indicia of the address character in each of the following level intervals, when the remaining count of the previous level interval has reached a given value.

7. A data transmission system according to claim 6 characterized in that second counting means are provided for counting the total number of detected different indicia corresponding to address characters in the received signal within each level interval, and for decreasing the respective count value by one unit with the occurrence of each address time slot interval within the next following level interval; and that said means for distinguishing level intervals are responsive to control signals which occur each time when one of the counting values in the second counting means reaches zero.

8. A data transmission system according to claim 7 characterized in that means are provided for distinguishing data packet slot intervals after receipt of a second flag; and that further means are provided for decreasing the count value of the last level interval by one unit with the occurrence of each packet slot interval, and for issuing a control signal (P3=1) which enables transmission of a data packet when the count value reaches a given number.

* * * * *